Jan. 28, 1969   J. MARTIN   3,424,408
VEHICLE EJECTION SEATS
Filed Oct. 31, 1966   Sheet 1 of 2

Inventor
JAMES MARTIN
By Kurt Kelman
AGENT

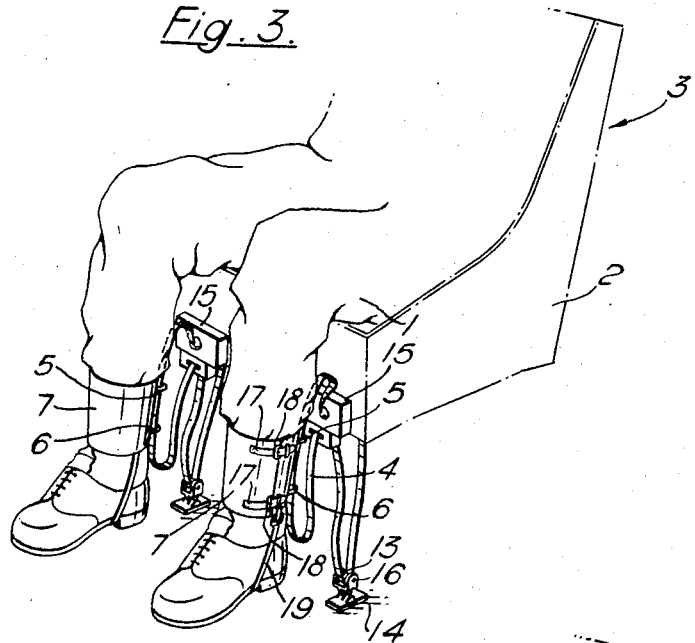
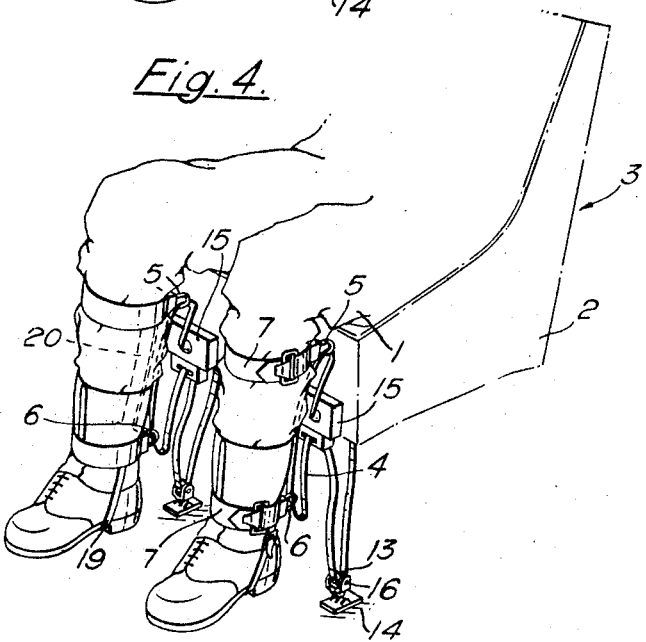

United States Patent Office 3,424,408
Patented Jan. 28, 1969

3,424,408
VEHICLE EJECTION SEATS
James Martin, Southlands Manor, Southlands Road,
Denham, near Uxbridge, Middlesex, England
Filed Oct. 31, 1966, Ser. No. 590,895
Claims priority, application Great Britain, Nov. 1, 1965,
46,253/65
U.S. Cl. 244—122                          5 Claims
Int. Cl. B64d 25/10; A62b 35/00

ABSTRACT OF THE DISCLOSURE

The tensioning lines associated with the ejection seat and the aircraft so that upward movement of the seat with respect to the aircraft causes their tensioning are attached to a pair of anchorages associated with each leg of the airman. The anchorages are below the airman's knees and spaced from each other.

---

This invention concerns vehicle ejection seats and has for its object to provide for an ejection seat means for restraining the legs of an occupant of the seat from movement during ejection.

Although this invention is particularly concerned with airmen and aircraft ejection seats and will be described in relation thereto, the terms "aircraft ejection seat" and "airman" should be understood to embrace any vehicle ejection seat and its occupant where the context so admits.

Known means for restraining the legs of an airman seated in an ejection seat suffer from a number of faults. For example, where restraint is transmitted to the legs of the airman by a single attachment immediately below the knee the feet of the airman are permitted, in some circumstances, to splay outwardly and also forwardly of the seat. Such permitted movement is undesirable. It has been found that the placing of the attachment on each leg at a position near the ankle limits the forward movement but still permits the knees of the legs of the airman to splay outwardly.

One object of this invention is therefore to provide restraining means which more satisfactorily meet present day requirements and which obviate, or at least reduce, the aforementioned disadvantages.

Thus, according to this invention there is provided restraining means for restraining the legs of an airman seated in an ejection seat during ejection of such seat, such means comprising at least one line associated with the ejection seat and with the aircraft in such a manner that movement of the seat with respect to the aircraft causes tensioning of the or each line, a pair of anchorages being associated with each of the legs of the airman to which said line or lines are attached, both of said anchorages being provided below the respective knee of the airman and being spaced apart from one another.

Whilst such anchorages may comprise fixed or removable rings on the actual flying suit of the airman, very conveniently, said anchorages on each leg may comprise a pair of rings secured to a common band of material in a spaced relationship, said band being adapted to be secured about the lower leg of the airman. Preferably each said band on each leg of the airman may be releasably secured about the respective leg of the airman by, for example, a quick release coupling.

In an alternative arrangement each anchorage may comprise a single ring carried by its own band and in such an arrangement two bands would be placed around each of the airman's legs, one band being above the other so that the rings would be spaced from one another. Said two bands could, if desired, be secured to one another by a strap to ensure correct spacing thereof.

If desired the band on each leg (or the lower band if two bands are provided) may carry a stirrup strap which is adapted to pass underneath the foot of the airman, the effective length of said strap desirably being adjustable.

In the preferred arrangement of restraining means a pair of tensionable lines are provided, each of said lines having a portion associated with a part of the aircraft carrying the ejection seat, for example the floor thereof, and another portion connected to the ejection seat. Each of said lines passes from said position on the aircraft through a snubbing box, normally permitting passage of the line therethrough only in a tensioning direction, through the spaced apart rings carried by the band about the appropriate lower leg of the airman and terminates at said position on the ejection seat in such a manner that the end connected to the ejection seat may easily be released during the ejection sequence to permit separation of the airman from the seat prior to his descent by parachute.

In order that this invention may be more readily understood certain embodiments of restraining means will now be described by way of example and with reference to the accompanying drawings in which:

FIGURE 3 is a similar view to FIGURE 1 but shows an alternative type of leg band having the necessary anchorages; and FIGURE 4 is a still further similar view showing another alternative arrangement of bands.

Figure 1:
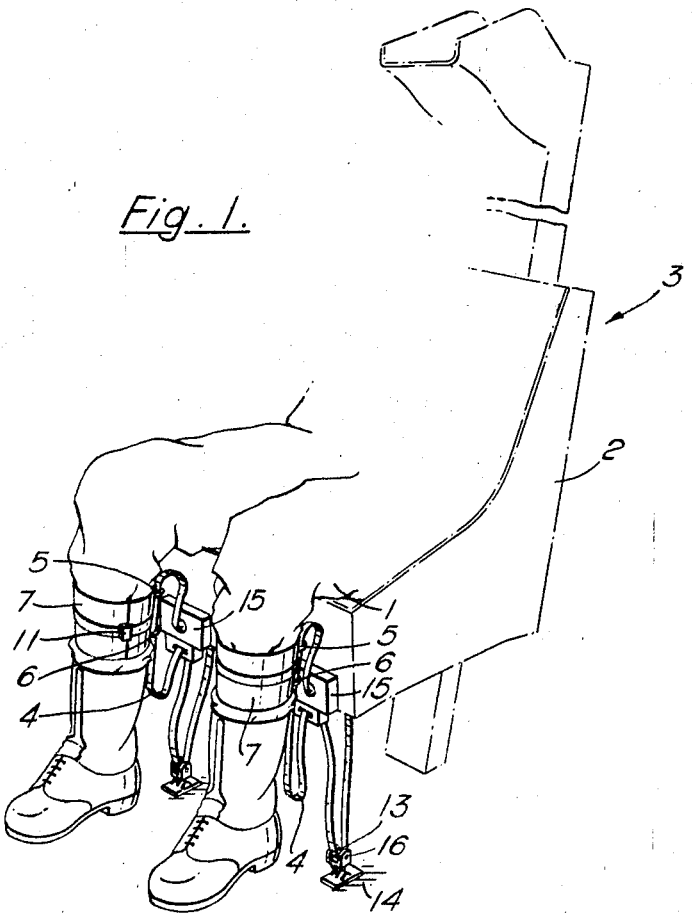
FIGURE 1 shows diagrammatically in perspective a portion of an ejection seat and a portion of the legs of an airman sitting in said seat, the legs of the airman each being provided with a preferred form of anchorage for the restraining means.

From FIGURE 1 it will be seen that the legs 1 of the airman are adapted to be moved from a normal flying position to a position adjacent the front of the pan 2 of an ejection seat 3 by means of a pair of tensionable lines 4 each passing through a pair of D-rings 5, 6 sewn to a band 7 at a position approximately midway along the length of the band 7. Bands 7 are releasably secured to the respective lower leg 1 of the airman by means of a strap 8, opposite ends of this strap being provided with the male and female parts 9, 10 of a quick release coupling 11 and a portion of this strap 8 being sewn to one face of the band 7.

Figure 2:
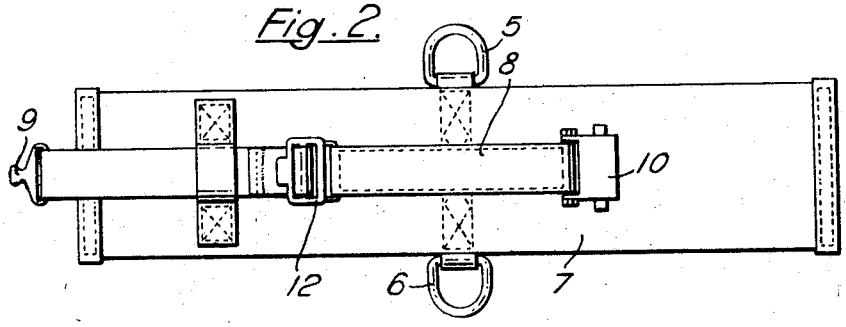
FIGURE 2 is a view showing in detail one of the leg bands shown about the legs of the airman in FIGURE 1.

In the preferred embodiment shown in FIGURE 2 the strap 8 is formed of two separate lengths of webbing interconnected by an adjusting buckle 12 which enables the tightness of the band 7, when the male and female parts 9, 10 of the coupling 11 are interconnected, to be altered. Similarly, from FIGURE 1 of the accompanying drawings it will be seen that the tensionable lines 4 have their ends secured to the ejection seat but that they are each threaded under a respective roller 13 which is secured to a portion of the aircraft, this portion being designated 14, so that movement of the ejection seat upwardly away from the portion 14 of the aircraft results in the drawing of the legs of the airman rearwardly to a position adjacent the front of the ejection seat pan 2 so that the legs 1 of the airman are correctly positioned for safe ejection prior to the ejection seat 3 leaving the aircraft.

A pair of snubbing boxes 15 are positioned on the seat and each line 4 passes through one of these snubbing boxes so that once the line has been drawn through said boxes in a line tensioning direction such lines cannot be drawn through the boxes in the opposite or releasing direction. Thus, once the lines 4 have been tensioned the tension in such lines cannot be removed until a pawl (not shown) in each of the snubbing boxes 15 has been released.

The roller 13 is secured to a portion of the aircraft 14 by means of a peg 16 and this peg is adapted to fracture when it is subjected to loads in excess of a predetermined amount. Thus, when the tension in the leg restraining lines 4 exceeds said predetermined amount the connection thereof to the portion 14 of the aircraft ceases.

The use of two D-rings 5, 6 on each of the legs 1 of the airman ensures that each leg is guided correctly into its withdrawn ejection position.

After ejection has taken place the end portion of the line connected to the seat and extending from the snubbing box through the D-rings is released either manually or automatically and the legs of the airman are freed prior to the separation of the airman from his seat and prior to his descent by parachute. It will be appreciated that the snubbing boxes are provided to permit tensioning of each line and to retain the or each line in a tensioned condition after fracture of the anchorages on the aircraft, at least until release of the line from the seat as referred to hereinbefore.

It will be appreciated that in this preferred arrangement of FIGURES 1 and 2 utilising rings connected to the bands, the airman prior to occupying his seat need merely place the bands about his legs, the tensioning lines 4 having already been threaded through the rings.

Referring now to FIGURE 3 it will be seen that each band 7 carries a pair of straps 17 equivalent to the strap 8 which, in turn, are threaded through a pair of corresponding buckles 18. It this embodiment a stirrup strap 19 is provided which is adapted to pass underneath the respective foot of the airman to ensure that the band 7 does not move from the correct position. It will be apparent that the effective length of the stirrup strap 19 is adjustable.

Referring lastly to FIGURE 4 it will be seen that the two D-rings 5, 6 which are attached to each of the airman's legs are carried by separate bands 7 which are coupled by means of a further strap 20, one of the bands 7 having a stirrup strap equivalent to the strap 19 described with reference to FIGURE 3.

In this particular embodiment the D-rings 5, 6 are releasably connected to the bands 7 and the airman would normally don the two bands prior to entering the aircraft and would, after seating himself in the ejection seat, merely clip the D-rings to the bands, such D-rings being permanently threaded on the tensionable lines 4.

It will be appreciated that in all the above-described embodiments the tensionable lines pass through two D-rings on each of the airman's legs and this dual anchorage of the tensionable lines 4 to each of the legs of the airman assists greatly in keeping the legs of the airman in alignment when they are being withdrawn into an ejection position and prevents or substantially reduces the pivotal movement of the leg about its anchorage point.

I claim:
1. In a restraining means for restraining the legs of an airman seated in an ejection seat in an aircraft during ejection of the seat, line means releasably secured to said aircraft and connected to said seat in such a manner that upward movement of the seat with respect to the aircraft causes tensioning of the line means, said line means being anchored to the legs below the knees, wherein the improvement comprises two pairs of vertically spaced anchorages, attached to the line means, one of the pairs of said anchorages mounted on each of the airman's legs by at least one band on each leg, said vertical spacing preventing the knees and feet of the airman from splaying outwardly during ejection.

2. In the leg restraining means of claim 1, a band secured about each leg below the knee, and said anchorages being constituted by a pair of rings secured to said band in spaced relationship.

3. In the leg restraining means of claim 2, a quick release coupling securing said bands about each leg.

4. In the leg restraining means of claim 1, two bands secured about each leg below the knee, one band above the other, and said anchorages being constituted by a ring secured to each of said bands so that the rings constituting the pair of anchorages on each leg are spaced from each other.

5. In the leg restraining means of claim 1, the line means being constituted by a pair of tensioning lines, each of said lines having a portion associated with the part of the aircraft carrying the ejection seat and another portion connected to the ejection seat, and each line being attached to a respective one of the pairs of anchorages.

References Cited

UNITED STATES PATENTS

| 2,528,532 | 11/1950 | Martin | 244—122 |
| 2,944,774 | 7/1960 | Martin | 244—122 |
| 3,074,669 | 1/1963 | Bohlin | 244—122 |
| 3,202,384 | 8/1965 | Martin | 244—122 |

MILTON BUCHLER, *Primary Examiner.*

RICHARD A. DORNON, *Assistant Examiner.*